United States Patent [19]
Klem et al.

[11] 3,839,626
[45] Oct. 1, 1974

[54] ALTIMETER SETTING INDICATOR SYSTEM AND METHOD OF OBTAINING SAID SETTING

[75] Inventors: Charles D. Klem, Phoenix; Cameron D. Ethridge, Glendale, both of Ariz.

[73] Assignee: Sperry Rand Corporation, New York, N.Y.

[22] Filed: May 7, 1973

[21] Appl. No.: 357,981

[52] U.S. Cl. ................... 235/151.3, 73/384, 235/92
[51] Int. Cl. ............................. G01l 7/00, G06f 7/02
[58] Field of Search ............. 235/151.3, 92, 151.32; 73/384, 387, 398; 328/1

[56] References Cited
UNITED STATES PATENTS
3,729,999  5/1973  Shimomura .......................... 73/384

*Primary Examiner*—Malcolm A. Morrison
*Assistant Examiner*—Edward J. Wise
*Attorney, Agent, or Firm*—Howard P. Terry; Albert B. Cooper

[57] ABSTRACT

An airport altimeter setting indicator system includes a barometric pressure sensor that provides a signal in accordance with the local barometric pressure at the airport. The local barometric pressure signal is converted to a corresponding local pressure altitude signal in accordance with standard day conditions. A signal proportional to airport elevation is subtracted from the pressure altitude signal providing an altitude difference signal. The altitude difference signal is converted to a corresponding barometric pressure signal under standard day conditions to provide the desired altimeter setting pressure.

26 Claims, 6 Drawing Figures

ALTIMETER SETTING INDICATOR SYSTEM AND METHOD OF OBTAINING SAID SETTING

BACKGROUND OF THE INVENTION

1. Field of the Invention

The present invention relates to barometric altimeter setting indicators particularly with regard to a system for converting a measure of airport barometric pressure to the altimeter setting barometric pressure and providing remote digital readouts thereof for reporting by the airport tower and/or air traffic control centers to approaching or en route aircraft under their jurisdiction.

2. Description of the Prior Art

The reporting of altimeter setting information by an airport traffic control tower and/or by ATC Regional Centers is a routine requirement for safe en route (altitude separation) and terminal area (approach) navigation and has been a standard procedure for many years. Presently, each control tower has one or more precision aneroid or bourdon tube type barometric pressure sensing altimeter setting indicators (ASI) having accuracies on the order of ±0.020 to ±.040 inches of mercury. Each sensor has to be calibrated periodically in accordance with its own calibration characteristic and this calibration "number" must be "greasepencilled" periodically on the face of the instrument and taken into account in the computation of the reported altimeter setting number. This task is difficult, time consuming and subject to human error. The altimeter setting indicator reading from such instruments is not readily converted into digital format for transmission throughout an airport for remote indication. It is often the situation that different calibration numbers must be added or subtracted from the instrument reading with respect to the various instruments at the airport, often resulting in discrepancies between altimeter settings communicated to aircraft from different sources at the same airport.

Considerable experimental effort in recent years has been expended in deriving systems by which the reading of a single or central aneroid altimeter setting indicator may be transferred to different remote locations, such systems including photoscanning techniques for converting pointer position to electrical signals, key punching from the aneroid sensor system and manometer systems employing complex digital processors. All of these efforts have resulted in apparatus which is prohibitively expensive and have therefore not been generally adopted.

SUMMARY OF THE INVENTION

The altimeter setting indicator system of the present invention involves a completely different approach to the computation and display problem of the above-described altimeter setting information. The present invention utilizes a barometric pressure sensor for providing a signal in accordance with local barometric pressure. A first converter responsive to the local barometric pressure signal converts this signal to a corresponding local standard day pressure altitude signal. A computer responsive to the local pressure altitude signal and a signal proportional to local elevation provides a signal corresponding to the altitude difference therebetween. A second converter responsive to the altitude difference signal converts this signal to a signal proportional to the corresponding standard day barometric pressure to provide the required altimeter setting pressure.

DESCRIPTION OF THE PREFERRED EMBODIMENT

In the preferred embodiment of the present invention, a relatively simple vibrating type (frequency a function of pressure) pressure sensor such as that disclosed in U.S. Pat. No. 3,456,508, issued July 22, 1969 to R. H. Frische, "Vibrating Diaphragm Pressure Sensor Apparatus" and assigned to the assignee of the present invention, is utilized to sense local barometric pressure. The output of the pressure sensor is converted, using special purpose digital computing techniques, to a binary coded decimal output corresponding to the altimeter setting barometric pressure, which output is provided to one or more remote decoding digital readout displays for use by the tower operators or ATC controllers in reporting the altimeter setting to those aircraft under their jurisdiction. The system output data may be converted to any standard data transmission format, such as, for example, a conventional frequency-shift-keying output or standard modem compatible output for direct transmission over telephone line circuits.

In the preferred embodiment of the invention, a high frequency clock oscillator is gated, for a fixed number of complete cycles of vibration of the pressure sensor through a binary rate multiplier into an altitude counter. The altitude counter contents are fed back to the multiplier through a calibration matrix or memory containing sensor period to "standard day" pressure constants for controlling the gain of the multiplier whereby the altitude counter contents are directly proportional to standard day local pressure altitude. This conversion technique may be of the type disclosed in U.S. Pat. No. 3,706,934 issued Dec. 19, 1972 to Robert W. Robinson entitled "Apparatus for Linearizing a Non-Linear Signal" and assigned to the assignee of the present invention. A comparator is utilized to compare the magnitudes of the local station or airport elevation which is set into the system and the output of the altitude counter.

The high frequency clock is gated into the altitude counter and is utilized to up or down count same until the number in the altitude counter is rendered equal to the local elevation. Since the output of the comparator is then equal to zero, the comparator output is applied to the clock gate to stop the count. Thus, the number of counts is proportional to the pressure altitude deviation with respect to sea level under standard day conditions and the corresponding standard day barometric pressure is the altimeter setting to be reported to the aircraft. Accordingly, this count is transferred through a binary rate multiplier into an altimeter setting indicator counter. The altimeter setting indicator counter contents are fed back to the multiplier through a calibration matrix or memory containing "standard day" pressure altitude to barometric pressure constants around sea level for controlling the gain of the multiplier whereby the altimeter setting indicator counter contents are rendered directly proportional to the "standard day" barometric pressure in inches of mercury or in millibars corresponding to the pressure altitude deviation.

The output of the altimeter setting indicator counter is applied to a serial data converter which converts the contents of the counter to a serial binary coded decimal word which in turn is transmitted to one or more remote indicators for decoding and display on a conventional seven segment alphanumeric digital readout, such as, for example, a seven segment gas tube display which may be of the type disclosed in U.S. Pat. No. 3,675,066 issued July 4, 1972 to James B. Armstrong et al entitled "Planar Raised Cathode Alpha-numeric Gas Discharge Indicator".

Figure 1:
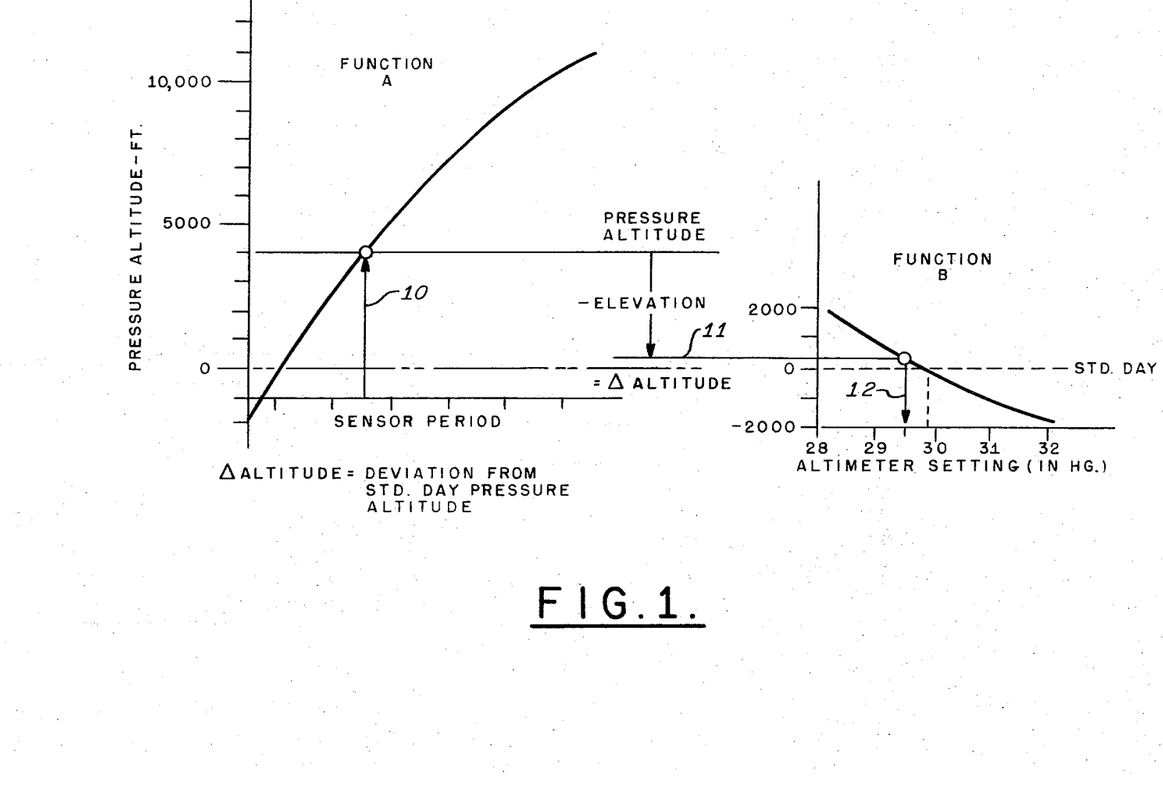
FIG. 1 is a graph illustrating altimeter setting indicator functions instrumented by the apparatus of the present invention.

Referring to FIG. 1, graphs of altimeter setting indicator functions instrumented by the apparatus of the present invention are illustrated. Vibrating diaphragm pressure sensors typically provide frequency versus pressure altitude characteristics of a nature described in said U.S. Pat. No. 3,456,508. The period of the sensor outpt signal is generally a non-linear function of pressure altitude, a typical sensor period versus pressure altitude characteristic being illustrated as function A. Function B of FIG. 1 illustrates the non-linear relationship between barometric pressure and pressure altitude in the region arond sea level which functional relationship is well known and defined by standard atmospheric tables and equations.

In practicing the invention, a pressure sensor output signal is converted to pressure altitude by means of the function A. For example, a pressure sensor whose output signal provides a period 10 is converted to a pressure altitude of 4,000 feet as illustrated. In the preferred embodiment of the invention, this functional relationship is linearized in a manner and for reasons to be explained. As illustrated in FIG. 1, the local elevation of the airport is subtracted from the extant pressure altitude to provide a delta altitude 11 representing the deviation from standard day pressure altitude at the airport, referenced to sea level. The delta altitude value 11 is converted to the corresponding barometric pressure 12 under standard day conditions by means of function B thereby providing the required altimeter setting pressure.

Figure 2:
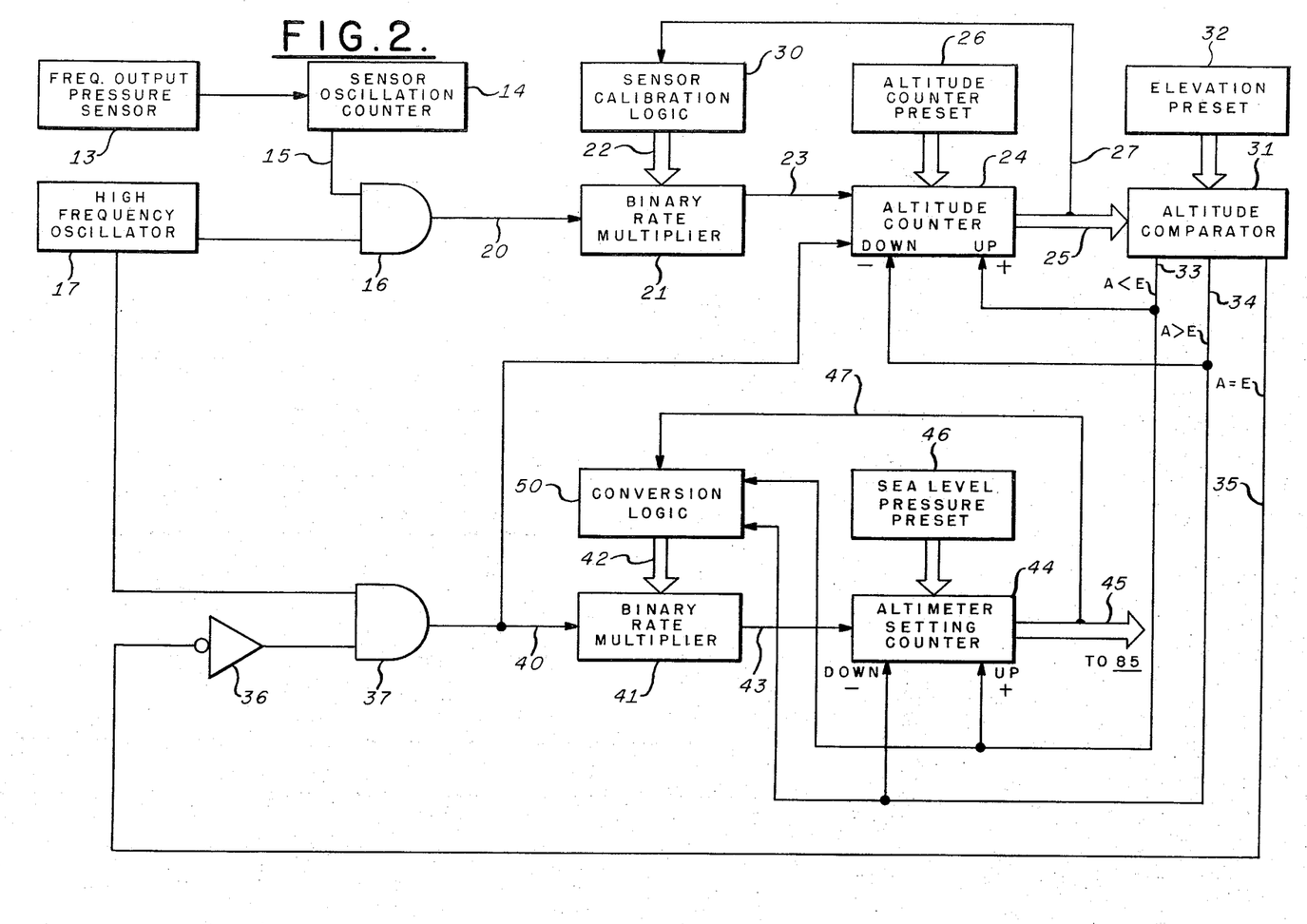
FIG. 2 is a schematic block diagram of the computation portion of the altimeter setting indicator system of the present invention.

Referring to FIG. 2, the computation portion of the altimeter setting indicator system of the present invention is illustrated in schematic block diagram form. An atmospheric pressure sensor 13 provides an output signal with frequency a predetermined function of atmospheric pressure. The pressure sensor 13 may be of the type disclosed in said U.S. Pat. No. 3,456,508. In the preferred embodiment of the invention, the period of the vibratory output from the pressure sensor 13 as a function of pressure is conveniently utilized in instrumenting the apparatus. The output from the pressure sensor 13 is applied to a sensor oscillation counter 14 wherein a predetermined integral number of cycles of the sensor output signal is counted to provide a gating pulse on a line 15 having a duration equal to the duration of the predetermined integral number of sensor output cycles. Thus, when the output from the pressure sensor 13 is of relatively high frequency, the width of the gating pulse on the line 15 is relatively narrow and when the frequency of the sensor output signal is relatively low, the width of the gating pulse is correspondingly relatively large. The counter 14 generates the gating pulse on the line 15 from the output of the pressure sensor 13 in a conventional manner utilizing logic circuits well known in the art. An instrumentation for the sensor oscillation counter 14 may be found in said U.S. Pat. No. 3,706,934.

The gating pulse on the line 15 is applied as an input to a gate 16, the other input of which being coupled to receive the output of a stable fixed frequency clock oscillator 17. The frequency of the clock oscillator 17 is preferably chosen to be substantially higher than the frequencies provided by the pressure sensor 13 so as to obtain adequate resolution for the apparatus. The gate 16 transmits the clock pulses from the oscillator 17 during the occurrence of the gating pulse on the line 15 thereby providing groups of pulses of pulse count in accordance with the period of the output of the pressure sensor 13 and hence in accordance with barometric pressure.

The groups of pulses from the gate 16 are applied to pulse train input 20 of a binary rate multiplier 21. The binary rate when said is a conventional circuit well known in the art and is controlled by its digital input 22 to provide a pulse train at its output 23 in accordance with the product of the number of pulses applied to the input 20 and the digital number applied to the input 22. Conventionally, the digital number applied to the input 22 is less than unity resulting in a decrease in the number of pulses at the output 23 compared to the number of pulses applied to the input 20.

The groups of pulses from the gate 16, as altered by the binary rate multiplier 21, are accumulated in an altitude counter 24. The altitude counter 24 is a conventional digital reversible counter that provides a digital altitude pulse count signal at its output leads 25 corresponding to the accumulated pulses. The counter 24 may be preset to an initial count by conventional altitude counter preset logic 26.

The altitude pulse count signal on the output 25 of the counter 24 is applied as a feedback signal on a lead 27 to sensor calibration logic 30. The sensor calibration logic 30 provides a sequence of digital parameter signals, in response to the altitude pulse count signal on the lead 27, to the digital control input 22 of the binary rate multiplier 21 to control the multiplication factor or gain thereof. The digital parameter signals are provided in accordance with a predetermined stored program relating the characteristic of the output of the pressure sensor 13 to pressure altitude under standard day conditions in a manner to be further described.

The sensor 13, counter 14, gate 16 and oscillator 17 comprise means for providing a signal in accordance with local barometric pressure as expressed by the period of the output of the sensor 13 in terms of the pulse counts on the lead 20. The multiplier 21, counter 24 and sensor calibration logic 30 comprise means for converting the pressure signal on the lead 20 to a corresponding local standard day pressure altitude signal. The gain of the binary rate multiplier 21 is controlled as a function of the contents of the altitude counter 24 by means of the calibration logic 30 to achieve the functional relationship illustrated as function A (FIG. 1), i.e. the conversion of the output period of the pressure sensor 13 to a digital number in the counter 24 linearly proportional to pressure altitude. The calibration logic 30 is chosen, in a manner to be described, such that the altitude counter 24 accumulates a number linearly proportional to local pressure altitude.

Prior to a computation of the apparatus of the present invention, the altitude counter preset logic 26 presets the altitude counter 24 with an initial value to be described and the reversible counter 24 is set to count in an upward direction. The altitude counter 24 then accumulates pulses as previously described to provide the digital altitude pulse count signal on the leads 25 linearly proportional to local pressure altitude. The structure and operation of these circuits will be further discussed hereinafter with respect to FIG. 3 and similar circuits are described in detail in said U.S. Pat. No. 3,706,934.

The operation of the apparatus of the present invention is achieved as a two-part computation. During the first part of the computation, the apparatus described above converts the local barometric pressure signal from the pressure sensor 13 to a corresponding standard day pressure altitude signal in the counter 24. In the second part of the computation, the local elevation is subtracted from the local pressure altitude signal and the resulting altitude deviation is converted to the corresponding standard day barometric pressure to provide the desired altimeter setting pressure.

The digital pressure altitude signal on the leads 25 are applied as an input to a digital comparator 31. The second input to the comparator 31 is provided by elevation preset circuit 32 that provides a digital signal corresponding to the actual local elevation of the airport at which the apparatus is to be utilized. The elevation preset circuit 32 may establish or set the local elevation signal by means of digital switches, or alternatively the local elevation signal may be preset and wired into logic incorporated with the comparator 31. The comparator circuit 31 compares the pressure altitude number in the counter 24 with the preset value of local elevation from the circuit 32 and provides signals on leads 33, 34 and 35 when the pressure altitude is less than, greater than or equal to the elevation, respectively. The leads 33 and 34 are connected to the reversible counter 24 to control the direction of count thereof. When the lead 33 is energized, indicating that altitude is less than elevation, the reversible counter 24 is controlled to count up and when the lead 34 is energized, indicating that altitude is greater than elevation, the counter 24 is controlled to count down.

The lead 35 is coupled via an inverter 36 to an input of a gate 37. The other input to the gate 37 is coupled to the oscillator 17 to receive the clock pulses generated thereby. Alternatively, this input to the gate 37 may receive clock pulses generated from the basic clock of the oscillator 17 in circuits now shown. The output of the gate 37 is applied to the altitude counter 24 to increase or decrease the count therein in accordance with the signals on the leads 33 and 34. When the pressure altitude is not equal to the preset elevation, the signal on the lead 35 via the inverter 36 renders the gate 37 conductive thereby transmitting the clock pulses from the oscillator 17 to the altitude counter 24. When, however, the pressure altitude is equal to the preset elevation, the signal on the lead 35 renders the gate 37 non-conductive thereby interrupting the transmission of clock pulses to the counter 24.

When the altitude number in the counter 24 is not equal to the elevation number from the preset logic 32, the comparator 31 controls the direction of count of the altitude counter 24 and controls the gate 37 to transmit clock pulses to the counter 24 until the altitude number therein matches the preset value of local elevation at which time the signal on the lead 35 renders the gate 37 non-conductive interrupting the clock pulse input to the counter 24. In this manner, a discrete number of pulses are transmitted by the gate 37 proportional to the difference between the local pressure altitude number in the counter 24 and the preset value of airport elevation. It is appreciated therefore that the comparator 31, the clock oscillator 17 and the gate 37 comprises a computer responsive to the local pressure altitude signal and the local elevation signal for providing a signal corresponding to the altitude difference therebetween.

During the second phase of the two-part computation discussed above, the altitude difference between local pressure altitude and airport elevation is derived as described and provided as a pulse count from the gate 37. Simultaneously with the generation of the altitude difference pulses from the gate 37, these pulses are converted to corresponding barometric pressure under standard day conditions. The altitude difference pulses from the gate 37 are applied to pulse train input 40 of a binary rate multiplier 41. The binary rate multiplier 41 is a conventional circuit similar to that described above with respect to the binary rate multiplier 21 and is controlled by its digital input 42 to provide a pulse train at its output 43 in accordance with the product of the number of pulses applied to the input 40 and the digital number applied to the input 42.

The pulses from the gate 37, as altered by the binary rate multiplier 41, are counted in an altimeter setting counter 44. The altimeter setting counter 44 is a conventional digital reversible counter that provides a digital altimeter setting pulse count signal at its output leads 45 corresponding to the pulses received from the binary rate multiplier 41. The up and down count direction inputs to the counter 44 are provided by the leads 33 and 34 respectively of the comparator 31. Thus when the local pressure altitude is less than the local elevation, the counter 44 is controlled to count in an upward direction and when the local pressure altitude is greater than the local elevation, the counter 44 is controlled to count in a downward direction. The counter 44 may be preset to an initial count by sea level pressure preset logic 46.

The altimeter setting pulse count signal on the output 45 of the counter 44 is applied as a feedback signal on a lead 47 to conversion logic 50. The conversion logic 50 is also responsive to the signals on the leads 33 and 34 from the altitude comparator 31. The conversion logic 50 provides a sequence of digital parameter signals to the digital control input 42 of the binary rate multiplier 41 to control the multiplication factor or gain thereof in response to the altimeter setting pulse count signal on the lead 47 and in response to the signals on the lead 33 and 34 in a manner to be explained. The digital parameter signals are provided in accordance with a predetermined stored program relating pressure altitude in the region around sea level to barometric pressure under standard day conditions in a manner to be further described.

The multiplier 41, counter 44 and conversion logic 50 comprise means for converting the altitude difference signal on the lead 40 to a corresponding standard day barometric pressure signal. The gain of the binary rate multiplier 41 is controlled as a function of the contents of the altimeter setting counter 44 by means of the conversion logic 50 to achieve the functional relationship illustrated as function B (FIG. 1), i.e. the conversion of the altitude difference signal to a digital number in the counter 44 linearly proportional to corresponding barometric pressure under standard day conditions.

Prior to a computation, the sea level pressure preset logic 46 presets the counter 44 with an initial value which, in the preferred embodiment of the invention, corresponds to the standard day value of atmospheric pressure at sea level. With the direction of count for the counter 44 determined by the altitude comparator 31, the gain of the binary rate multiplier 41 is controlled by the conversion logic 50 in a manner such that the contents of the altimeter setting counter 44 are increased or decreased from the preset value provided by the circuits 46 in accordance with the function B of FIG. 1 by a pressure differential related to the number of pulses from the gate 37 required to make the contents of the altitude counter 24 match the preset elevation from the circuit 32. The controlled binary rate multiplier and counter configuration for the generation of non-linear functions such as the function B may be of the type disclosed in said U.S. Pat. No. 3,706,934 and will be further described hereinbelow with respect to FIG. 4.

The complete conversion performed by the circuit of FIG. 2 may be expressed as $$P_a = P_o + F_B(H_p - H_e)$$

where
$P_a$ = altimeter setting pressure,
$P_o$ = standard day sea level barometric pressure,
$F_B$ = Function B of FIG. 1,
$H_p$ = local pressure altitude, and
$H_e$ = local elevation.

The contents of the altimeter setting counter 44 as provided on the leads 45 are applied to a parallel to serial data converter and line transmitter for transmission to remotely located indicators or to other terminals desiring the information. This output data may be transmitted in any conventional data format or code, for example via frequency shift keying circuitry or standard modem compatible output circuitry, for transmission to remote stations over telephone lines. These aspects of the invention will be illustrated and discussed hereinbelow with respect to FIGS. 4 and 5.

Figure 3:
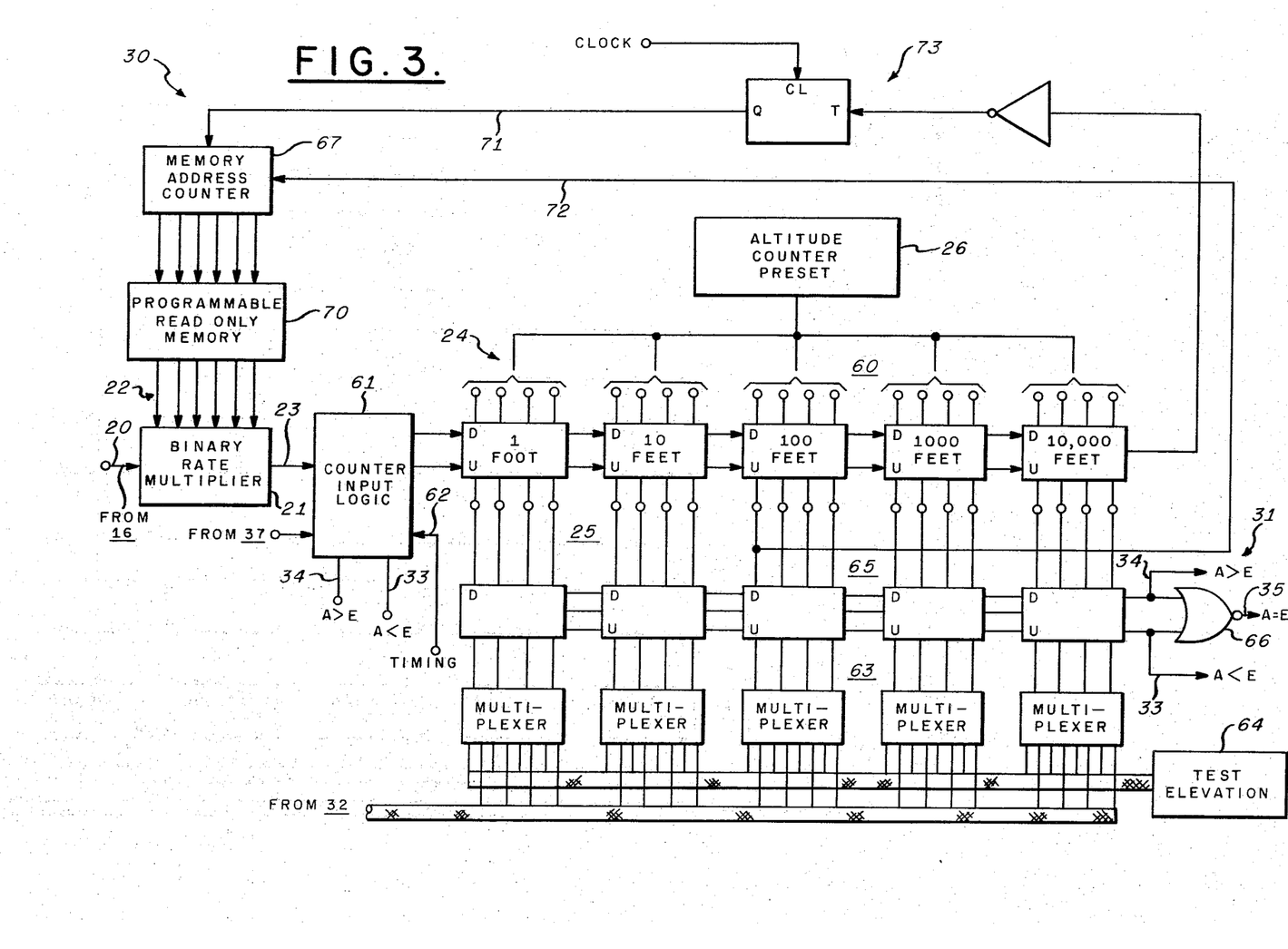
FIG. 3 is a detailed schematic block diagram of a portion of FIG. 2.

Referring to FIG. 3 in which like reference numerals indicate like components with respect to FIG. 2, a block schematic diagram showing details of the components 21, 24, 26, 30 and 31 of FIG. 2 is illustrated. As previously discussed with respect to FIG. 2, the pressure altitude pulse count from the gate 16 is applied through the binary rate multiplier 21 to the counter 24. The counter 24 comprises a conventional reversible binary coded decimal counter including serially connected decade stages 60 and counter input logic 61. The counter input logic 61 is configured in a conventional manner to perform the functions hereinabove described. For example, during the first phase of the previously discussed computation, conventional timing signals on a lead 62 cause the logic 61 to connect the output 23 of the binary rate multiplier 21 to the up input (U) of the least significant units stage of the decade stages 60. Thus during the first phase of the computation, the counter 24 is arranged to count the pulses on the line 23 in an upward direction. During the second phase of the computation, the timing signals on the lead 62 in combination with the signals on the leads 33 and 34, cause the output of the gate 37 (FIG. 2) to be selectively connected to either the up input (U) or the down input (D) of the least significant units stage of the decade stages 60. When the lead 33 is energized, indicating altitude less than elevation, the gate 37 is coupled to the up input. When the line 34 is energized, indicating altitude greater than elevation, the gate 37 is coupled to the down input. It will be appreciated that numerous circuits are known in the art for implementing the specified connections and will not be further described herein for brevity.

As previously discussed with respect to FIG. 2, the altitude counter preset logic 26 is utilized to preset an initial value into the decade stages 60 of the counter 24. The binary coded decimal output from the counter 24 on the leads 25 is applied to the comparator 31. The other input to the comparator 31 is provided from conventional multiplexers 63 which selectively apply either the preset elevation in binary coded decimal format from the circuit 32 (FIG. 2), or a test elevation signal from a register 64 for self-test purposes to be later described. The comparator 31 comprises a conventional binary coded decimal comparator with binary coded decimal stages 65, the output of which provides a signal on the lead 33 when the binary coded decimal number from the altitude counter 24 is less than the binary coded decimal elevation number from the multiplexers 63 and provides an output on the lead 34 when the altitude signal is greater than the elevation signal. The comparator output leads 33 and 34 are logically combined in a conventional NOR gate 66 to provide the signal on the lead 35 when altitude is neither less than nor greater than elevation, i.e. altitude equals elevation.

The sensor calibration logic 30 discussed above with respect to FIG. 2 is comprised of a memory address counter 67 that provides digital address signals to a programmable read only memory 70. The counter 67 is a conventional pulse counter that may be set to zero by a signal on a lead 71 and is advanced one count for each pulse applied on a lead 72. As the counter 67 advances through its counts in response to signals on the lead 72, a sequence of digital address signals are provided to the memory 70 causing a sequence of stored digital parameter signals to be provided to the digital control input 22 of the binary rate multiplier 21. The lead 71 is coupled through simple flip-flop logic 73 to the overflow output of the altitude counter 24. Thus, when the altitude counter 24 overflows to zero, the memory address counter 67 is set to zero. The lead 72 is coupled to the hundreds stage of the altitude counter 24 so that the memory address counter 67 is advanced one count for each 200 feet of altitude accumulated by the counter 24.

The constants stored in the memory 70 and the preset constant from the circuit 26 instrument the function A of FIG. 1 relating the sensor pulse count from the gate 16, i.e. sensor period, to standard day pressure altitude in the manner explained in detail in said U.S. Pat. No. 3,706,934. Briefly, the function A is approximated by a plurality of linear segments of varying slope. The line 72 connected to the output of the counter 24 detects the value of pressure altitude at the break points between the segments. The digital output from the counter 67 results in a digital parameter signal from the memory 70 to be applied to the binary rate multiplier 21 to control the multiple thereof for each segment approximating the function A so as to effectively alter the slope of each segment to a predetermined slope thereby linearizing the function. The altitude counter preset logic 26 is configured to preset the counter 24 with a number somewhat less than full count such that the counter 24 will overflow to zero at a pressure altitude count value of −2,000 feet. Thus it is appreciated that the altitude counter 24 is calibrated to provide pressure altitude plus 2,000 feet so that the altimeter setting pressure range will include pressures greater than the standard sea level value to accommodate all existing airport elevations. The altitude counter preset logic 26 is arranged in this manner so that the altitude counter 24 need only count upwardly for all computations of pressure altitude thus simplifying the logic for this portion of the apparatus. In order to compensate for this 2,000 foot bias the elevation preset logic 32 (FIG. 2) or the sea level pressure preset logic 46 (FIG. 2) may be similarly biased.

It will be appreciated that the constants stored in the memory 70 and the number provided by the altitude counter preset logic 26 are chosen to match the characteristics of the particular input pressure sensor 13 (FIG. 2) utilized in the system. Since individual pressure sensors normally exhibit somewhat different characteristics from one another, the memory 70 and the circuit 26 may be instrumented as pluggable circuit chips to be changed when one pressure sensor is replaced by another.

Prior to a computation, the binary rate multiplier 21 is programmed for a fixed gain and the memory address counter 67 is set to zero. When the count value equivalent to −2,000 feet has been accumulated by the counter 24, the counter overflows to zero and the 10,000 foot decade stage of the stages 60 enables the memory address counter 67 which advances by one count for each fixed increment advance of the altitude counter 24 (for example 200 feet in the illustrated embodiment) until the high frequency clock pulses from the oscillator 17 are cut off by the sensor oscillation counter 14 via the gate 16.

Figure 4:
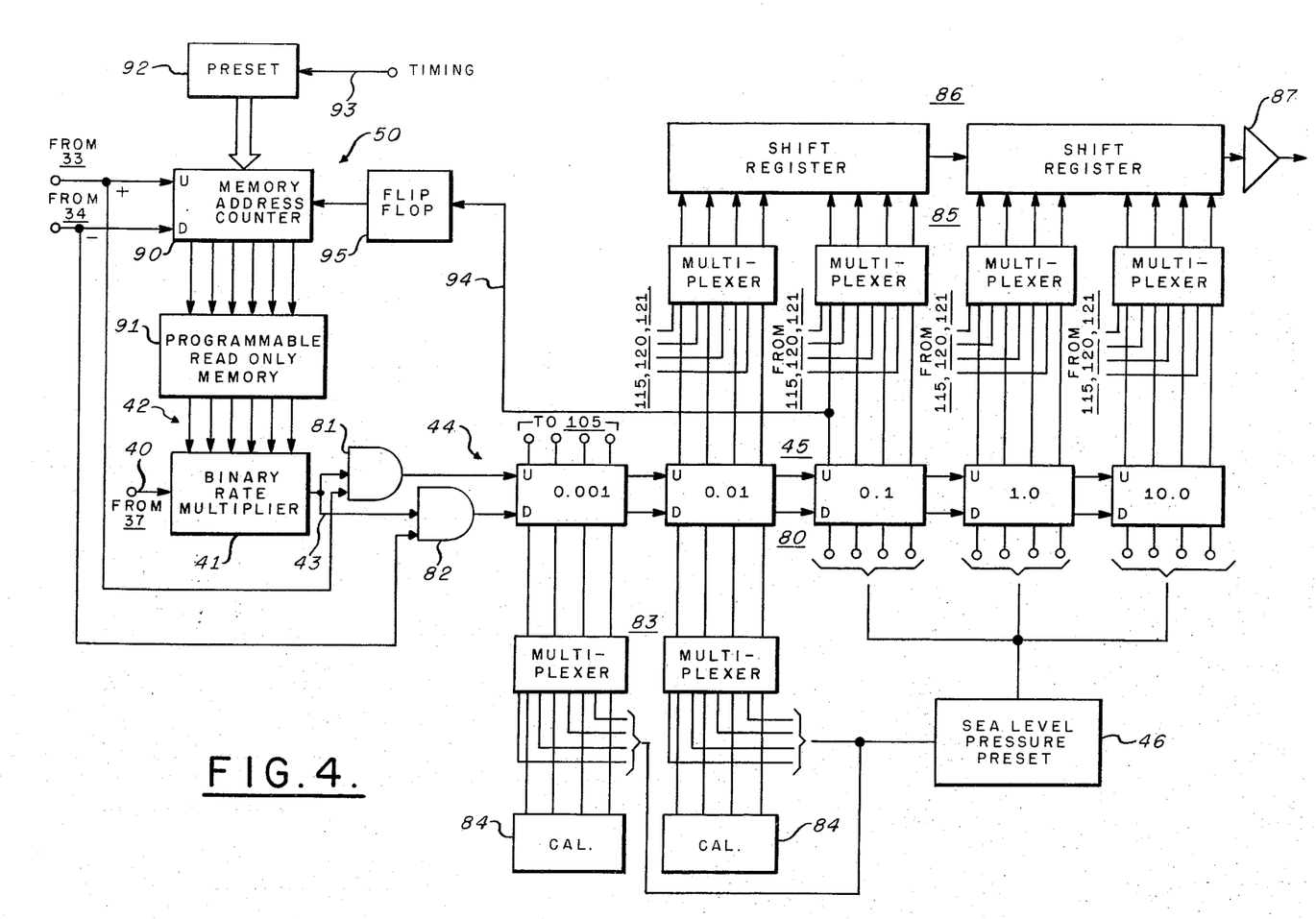
FIG. 4 is a detailed schematic block diagram of another portion of FIG. 2.

Referring to FIG. 4, in which like reference numerals indicate like components with respect to FIG. 2, a block schematic diagram showing details of the components 41, 44, 46 and 50 is illustrated. As previously discussed with respect to FIG. 2, the altitude difference pulse count from the gate 37 is applied through the binary rate multiplier 41 to the counter 44. The counter 44 comprises a conventional reversible binary coded decimal counter including serially connected decade stages 80 and counter input gates 81 and 82. The gates 81 and 82 may be configured as AND gates with the output of the gate 81 connected to the up input of the least significant decade stage of the stages 80 and the output of the AND gate 82 connected to the down input thereof. Both of the AND gates 81 and 82 receive as one input the pulse train output 43 from the binary rate multiplier 41. The other input to the AND gate 81 is connected to the lead 33 from the comparator 31 (FIG. 2) and the other input to the AND gate 82 is connected to the lead 34 of the comparator 31. Thus the counter 44 is connected to count the pulses from the binary rate multiplier 41 upwardly or downwardly in accordance with the altitude less than elevation signal on the line 33 and the altitude greater than elevation signal on the line 34 respectively.

As previously discussed with respect to FIG. 2, the sea level pressure preset logic 46 is utilized to preset an initial value into the decade stages 80 of the counter 44. This number is provided in binary coded decimal format and is applied directly to the three most significant stages of the decade stages 80 and via multiplexers 83 to the two least significant stages thereof. The multiplexers 83 selectively apply either the two least significant digits from the preset logic 46 or binary coded decimal signals from the thumb wheel switches 84 for calibration purposes in a manner to be described.

The binary coded decimal output from the four most significant decade stages of the counter 44 is applied via conventional multiplexers 85 to a conventional shift register parallel-to-serial converter 86. The output of the parallel-to-serial converter 86 is coupled to a line driver 87 for transmission of the serial data to remote indicators in a manner to be described with respect to FIGS. 5 and 6. The multiplexers 85 also receive failure indicia signals and selectively apply either these signals or the altimeter setting pulse count signal from the counter 44 to the parallel-to-serial converter 86 for failure mode purposes to be later described.

The conversion logic 50 discussed above with respect to FIG. 2 is comprised of a memory address counter 90 that provides digital address signals to a programmable read only memory 91. The counter 90 is a conventional reversible pulse counter that may be set to an initial pulse count by conventional preset logic 92 in response to a timing signal on a lead 93. The up and down direction of count control inputs to the counter 90 are provided from the leads 33 and 34, respectively, of the altitude comparator 31 (FIG. 2). When altitude is less than elevation, the signal on the lead 33 controls the counter 90 to count in an upward direction and when altitude is greater than elevation, the signal on the lead 34 controls the counter 90 to count downwardly. The counter 90 is advanced upwardly or downwardly from the initial value preset by the logic 92 in response to pulse signals on a lead 94 via flip-flop logic 95. The lead 94 is coupled to the 0.1 inches of mercury stage of the counter 44 to provide a pulse for each 0.2 inches of mercury accumulated thereby. The control flip-flop 95 or a series of flip-flops may be utilized as a pulse count divider to provide for fewer inputs to the counter 90 than those provided on the line 94. As the counter 90 advances through its counts in response to the pulses from the flip-flop 95, a sequence of digital address signals are provided to the memory 91 causing a sequence of stored digital parameter signals to be provided to the digital control input 42 of the binary rate multiplier 41. The constants stored in the memory 91 and the preset constant from the circuit 46 instrument the function B of FIG. 1 relating the altitude difference to standard day barometric pressure in the region around sea level in the manner explained above with regard to the binary rate multiplier 21 and as explained in detail in said U.S. Pat. No. 3,706,934.

In the operation of the circuit of FIG. 4, the altitude difference pulse count from the gate 37 required to achieve agreement between the altitude counter 24 (FIG. 2) and the elevation setting from the circuit 32 (FIG. 2) is gain scheduled through the binary rate multiplier 41 and then utilized to up or down count the altimeter setting counter 44. The counter 44 is preset by the fixed logic 46 to a nominal value equivalent to standard day sea level barometric pressure. The memory address counter 90 is set via the logic 92 for each computation cycle to a nominal midcount value to command a gain for the binary rate multiplier 41 equivalent to the slope of the pressure versus altitude function B at sea level as illustrated in FIG. 1. The memory address counter 90 is advanced in an increasing or decreasing direction at uniform increments of the altimeter setting counter 44 in response to the direction of count control signals on the leads 33 and 34 from the altitude comparator 31 (FIG. 2).

The counter 90 provides the digital address signals to the memory 91 for controlling the gain of the binary rate multiplier 41 in the manner previously described. The counter 44 may provide altimeter setting pressure in inches of mercury, millibars, millimeters of mercury or the like, merely by changing the fixed preset 46 and the constants stored in the memory 91. It is appreciated that the connections to the direction of count control of the memory address counter 90 are arbitrarily selected. These connections may be reversed with respect to the up and down direction of count control inputs providing that the memory 91 is addressed to provide the required digital parameter signals for controlling the binary rate multiplier 41 in accordance with the function B (FIG. 1).

The calibration thumb-wheel switches 84 are utilized to calibrate the apparatus of the present invention with regard to varying characteristics of different pressure sensors 13 (FIG. 2) utilized with the instrument as well as to compensate for sensor drift. During a computation cycle of the invention, the sea level pressure preset circuits 46 provide the initial value to the three most significant stages of the counter 44 whereas the calibration thumb-wheel switches 84 provide the initial value to the two least significant stages thereof via the multiplexers 83. During a calibration procedure, a calibrated pressure is applied to the pressure input of the sensor 13 (FIG. 2) equivalent to standard day pressure at the elevation at which the instrument is being utilized. The calibration thumb-wheel switches 84 are then positioned so that the altimeter setting counter 44 provides a reading equal to standard day sea level barometric pressure. During a self-test cycle, to be later described, the preset circuits 46 provide the nominal value equivalent to standard day sea level barometric pressure (29.921 inches of mercury or the equivalent in millimeters of mercury or millibars) to all five stages of the counter 44.

The output of the four most significant digits of the altimeter setting counter 44 are transmitted through the multiplexers 85 to the shift register parallel-to-serial converter 86 and to the serial line driver 87 to remote displays to be described. The multiplexers 85 are utilized to insert failure indicia or warm-up warning symbol signals into the serial data output from the line driver 87 for display on the remote indicators in a manner to be further explained. The output of the least significant stage of the counter 44 is connected to a maintenance display panel in a manner to be later described with respect to FIG. 5.

The above discussion with respect to FIGS. 2, 3 and 4 illustrates a pressure sensor 13 with a characteristic that generates an increasing period for decreasing pressure. Relatively minor changes in the digital logic of the blocks 26, 46, 70 and 91 will permit operation with a pressure sensor providing an increasing sensor period with increasing pressure and additionally will permit calibration of the apparatus in terms of a variety of units such as elevation measured in feet or meters and altimeter setting pressure measured in inches of mercury, millimeters of mercurcy, millibars or the like.

The function generation method described above with regard to functions A and B of FIG. 1 in accordance with that described in detail in said U.S. Pat. No. 3,706,934 provides for a series of straight-line segments at constant intervals of the output variables of altitude from the counter 24 and altimeter setting pressure from the counter 44, the straight-line segments having varied slopes in accordance with the constants stored in the memories 70 and 91. An alternative method of function generation may be implemented where the pulse count signal from either the counter 24 or 44 is gated through a parallel set of binary-to-decimal decoders (not shown). Logic circuits coupled to the decoders may be utilized to establish slope change points to match the function curve required. A control counter coupled to the logic circuits would be advanced one count at each slope break point, the digital output of the counter being used to control the associated binary rate multiplier. This method results in a series of straight-line segments with constant slope increment and varied slope change intervals. This method is also discussed in detail in said U.S. Pat. No. 3,706,934 and may be particularly suited to the altimeter setting pressure curve shape of function B where the function is fixed with a minimum of slope changes required.

It will be appreciated that the slope change points controlled by the connections of the lead 72 to the counter 24 (FIG. 3) and the lead 94 to the counter 44 (FIG. 4) in the abovedescribed embodiment may be varied by connecting these leads to other output points from the counters in accordance with the requirements of the functions to be generated.

Figure 5:
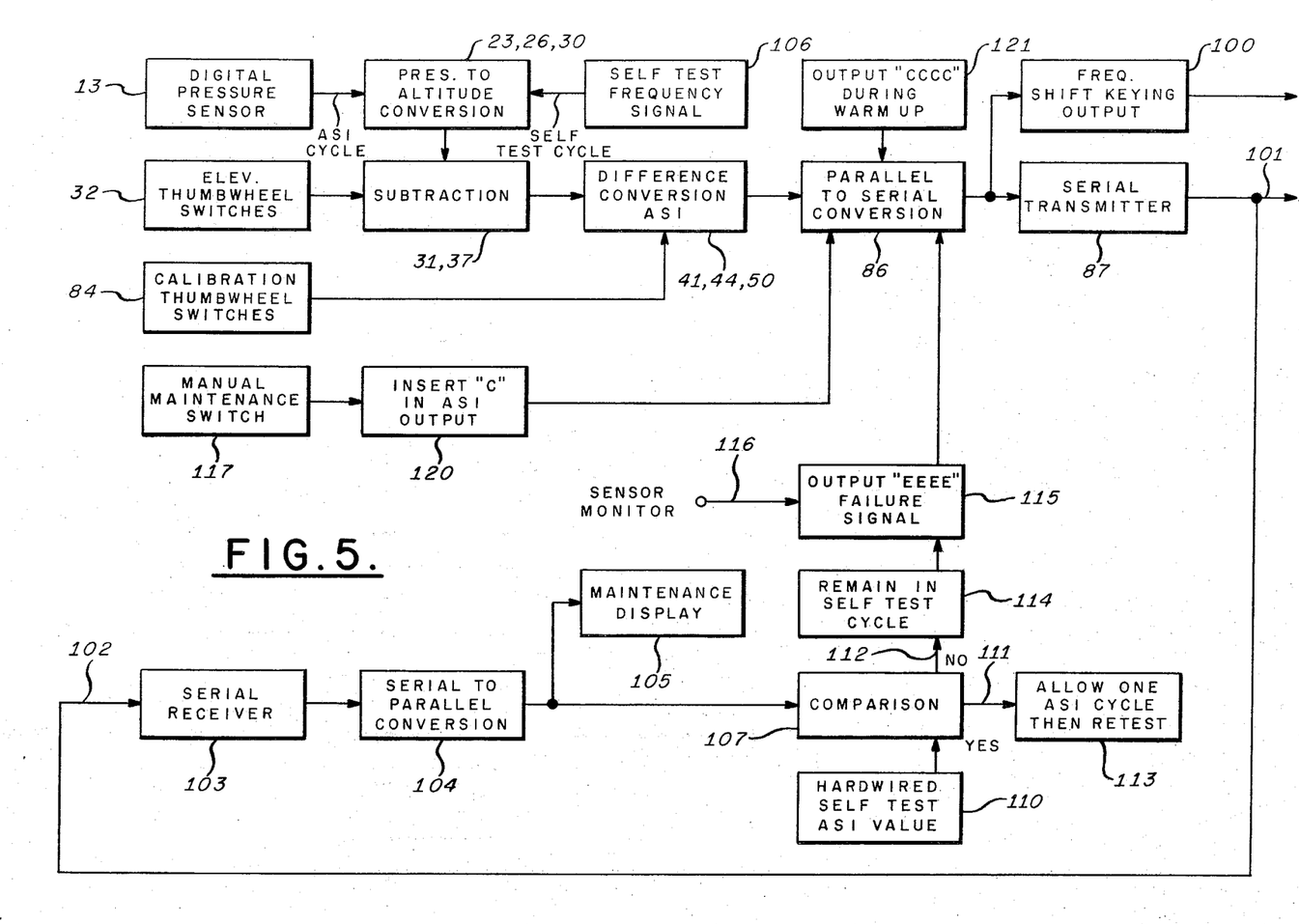
FIG. 5 is a schematic block diagram illustrating additional features of the altimeter setting indicator system of the present invention.

Referring to FIG. 5 in which like reference numerals indicate like components with respect to FIGS. 2, 3 and 4, a schematic block diagram is illustrated showing additional features of the system such as self-test and maintenance monitoring. As previously described, the output of the pressure sensor 13 is converted to pressure altitude in the block 23, 26, 30 from the output of which the elevation from the switches 32 is subtracted in the block 31, 37. The altitude deviation is converted to altimeter setting pressure in the block 41, 44, 50. As previously described, this is a two-part computation wherein the first part the pressure is converted to pressure altitude and in the second part the altitude difference is derived and converted to altimeter setting pressure. The output of the altimeter setting counter 44 is applied to the parallel-to-serial converter 86 and then to a suitable line driver 87. The output of the parallel-to-serial converter 86 is also applied to frequency shift keying apparatus 100 or other standard modem computable interface apparatus for data transmission over telephone communication equipment. The serial data from the line transmitter 87 is transmitted via an output line 101 to remote altimeter setting displays in a manner to be explained with regard to FIG. 6.

The serial data output on the line 101 is fed back through a line 102 to a serial data receiver 103 and then to a conventional serial-to-parallel data converter 104. The output of the serial-to-parallel converter 104 is applied to a maintenance display 105 which provides a five-digit indication of the altimeter setting pressure from the counter 44 (FIG. 4). The four most significant digits from the counter 44 are converted into serial format and transmitted to remote indicators, as previously explained, via the output 101 and also provide the data for the four most significant digits of the maintenance display 105 via the lead 102. The data for the least significant digit of the maintenance display 105 is provided from the least significant stage of the counter 44 (FIG. 4) by connections not shown for clarity. The accuracy provided by the four most significant digits from the counter 44 are adequate for providing the altimeter setting pressure data. The least significant fifth digit is utilized for maintenance and calibration purposes and for performing accuracy tests of the system.

For self-test purposes, the apparatus includes self-test frequency generator 106 whose output signal replaces the output signal from the pressure sensor 13 during the self-test cycles which alternate with the altimeter setting pressure computing cycles. The self-test frequency generator 106 provides a fixed frequency signal to the system. During the self-test cycle, the elevation setting value established by the thumb-wheel switches 32 is replaced by a self-test value of elevation from the test elevation register 64 (FIG. 3) by means of the multiplexer 63 (FIG. 3). During the self-test cycle, the output of the calibration thumb-wheel switches 84 are replaced via the multiplexers 83 (FIG. 4) by the nominal sea level pressure preset from the circuits 46 so that the selftest cycle is not affected by calibration procedures.

This self-test configuration results in a predefined altimeter setting pressure in the counter 44 (FIG. 4) which is transmitted via the lead 102 to the serial-to-parallel converter 104 and applies to a comparator 107. This predetermined value is compared in the comparator 107 with a hardwired self-test altimeter setting pressure value from circuits 110. During proper operation in the self-test mode, the output from the serial-to-parallel converter 104 is identical to that provided by the hardwired circuit 110 and the comparator 107 provides a "yes" signal on the lead 111. When a system failure occurs, the value provided by the serial-to-parallel converter 104 no longer compares with the hardwired value from the circuit 110 and the comparator 107 provides a "no" signal on a lead 112.

When the comparator circuit 107 provides a "yes" signal, logic 113 is included to permit a normal computation cycle to follow the self-test cycle. When a failure occurs, the comparator 107 provides the "no" signal to logic 114 to cause the system to remain in the self-test cycle. Logic circuits of the type utilized in the blocks 107, 113 and 114 are well known in the art and will not be further described herein for brevity.

When a failure occurs, the logic 114 repeats the self-test cycle for verification purposes. In the event of failure, the logic 114 provides a signal to a circuit 115 that inserts a failure code into the parallel-to-serial converter 86 for transmission to the remote indicators. The failure code is configured to cause the remote indicators to display a failure indicium as indicated by the legend in the block 115. The self-test apparatus detects any electrical failure that occurs in the entire system except for failures that may occur in the basic pressure system. The efficacious operation of the pressure sensor 13 may also be monitored via a lead 116 to the block 115.

When maintenance is performed on the system, special output data words are introduced into the parallel-to-serial converter 86 to warn users that the displayed output may not be utilized. For example, when a pressure other than ambient air pressure is connected to the unit or the thermal control on the pressure sensor 13 is not in tolerance, a manual maintenance switch 117 via circuits 120 is utilized to introduce appropriate codes into the system to provide the special output data words. Additionally, a block 121 is included to provide a warning display to system users during the apparatus warm-up interval when the data would normally not be reliable. The indicia for failure conditions or improper operation are indicated by the legends in the blocks 115, 120 and 121. The self-test data word generated by the self-test components 106 and 64 (FIG. 3) is displayed on the maintenance display 105 but is inhibited from transmission to the remote displays in a manner to be described with respect to FIG. 6.

Figure 6:
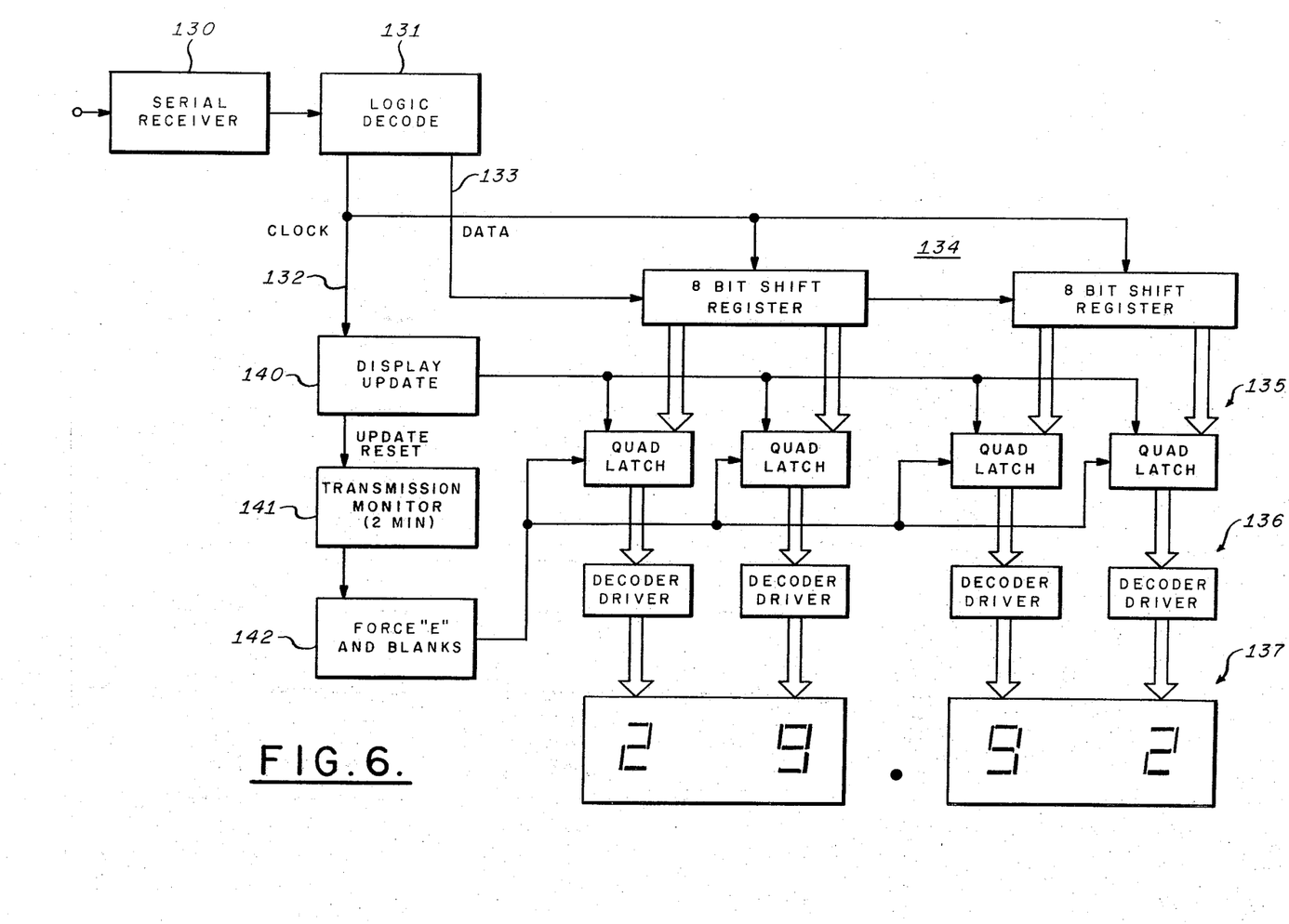
FIG. 6 is a schematic block diagram of a remote indicator utilized in the altimeter setting indicator system of the present invention.

Referring now to FIG. 6 a schematic block diagram of a remote indicator of the altimeter setting indicator system of the present invention is illustrated. The serial data output on the lead 101 (FIG. 5) is applied to a serial data receiver 130. The output of the receiver 130 is applied to a decoder 131 that rejects a self-test word transmission but transmits normal data or failure codes. The decoder 131 receovers the timing from the received data in a well known manner to provide a timing clock signal for the circuit on a lead 132. The decoder 131 also provides the recovered data on a line 133.

The serial data on the line 133 is applied to a conventional shift register serial-to-parallel converter 134 whose parallel outputs are applied to commercially procurable latching circuits 135. The outputs of the latches are applied through drivers 136 to display the altimeter setting pressure in digital format on any convenient binary coded decimal indicating display 137. The indicating displays are preferably of the type disclosed in said U.S. Pat. No. 3,675,066.

A display update circuit 140 responsive to the clock signals on the lead 132 are utilized to update the display via updating inputs to the quad latches 135. A transmission monitor 141, responsive to the display update circuit 140, is included to provide a failure signal after a predetermined delay in the event a valid update is not received within the prescribed time interval. The failure signal is introduced into the quad latches 135 via a circuit 142 in response to an output from the transmission monitor 141. This transmission monitoring feature protects against an interruption or loss of data on the serial transmission line which would otherwise result in a fixed display not responsive to pressure inputs to the pressure sensor 13 of the system. It will be appreciated that each of the blocks of FIG. 6 may be implemented by conventional circuitry for performing the described functions in a well known manner and will not be further described herein for brevity.

Although the embodiment of the present invention described above and illustrated in the drawings was explained in terms of binary rate multipliers, it will be appreciated that other circuits known in the art may be utilized to the same effect. For example, any controllable frequency divider or multiplier such as that described in said U.S. Pat. No. 3,706,934 may also be employed.

The system described hereinabove performs the function of providing a display of altimeter setting pressure in accordance with the functional relationships described with regard to FIG. 1. It will be appreciated that the conventional barometric sensing instrument for providing sea level barometric pressure does not provide the desired altimeter setting pressure. In a barometric pressure instrument for use at a particular elevation, the pressure element is constructed to provide an output linear with pressure. To obtain equivalent sea level barometric pressure from a barometer located at a particular location, the standard day pressure for the elevation is subtracted from the pressure sensor output and this pressure difference is utilized to correct the standard day sea level barometric pressure to provide the required indication. The standard barometric sensing instrument or "wall barometer" thus includes a pressure offset for local elevation to provide the corresponding sea level barometric pressure. In general this will not be the correct altimeter setting pressure required for use at airports for reporting to aircraft under their jurisdiction.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A system for computing altimeter setting pressure from local barometric pressure comprising
    barometric pressure sensor means for providing a signal in accordance with local barometric pressure,
    first converter means responsive to said local barometric pressure signal for converting said pressure signal to a corresponding local standard day pressure altitude signal,
    settable means for providing a signal corresponding to actual local elevation,
    computer means responsive to said local pressure altitude signal and said local elevation signal for providing a signal corresponding to the altitude difference therebetween, and
    second converter means responsive to said altitude difference signal for converting said altitude difference signal to a signal proportional to the corresponding standard day barometric pressure to provide said altimeter setting pressure.

2. The system of claim 1 further including display means responsive to said altimeter setting pressure signal for displaying said altimeter setting pressure.

3. The system of claim 1 in which said barometric pressure sensor signal has a predetermined characteristic with respect to pressure altitude and said first converter means comprises
    first variable gain means responsive to said sensor signal,
    altitude indicating means responsive to the output signal of said first variable gain means, and
    first feedback means responsive to the output signal of said altitude indicating means and including first predetermined program means relating said sensor signal characteristic to pressure altitude under standard day conditions,
    said first variable gain means being responsive to the output signal of said first feedback means for controlling the gain thereof for rendering said output signal of said altitude indicating means proportional to local pressure altitude under standard day conditions.

4. The system of claim 3 in which
    said barometric pressure sensor means comprises vibratory pressure sensor means for providing groups of pulses of pulse count in accordance with said local barometric pressure,
    said first program means includes means relating said sensor pulse count to pressure altitude under standard day conditions,
    said first variable gain means comprises first variable frequency altering means for altering said pulse count in accordance with said output signal of said first feedback means, and
    said altitude indicating means comprises altitude pulse counting means for providing an altitude pulse count signal in accordance with the altered pulse count from said first frequency altering means,
    whereby said altitude pulse count signal of said altitude pulse counting means is rendered proportional to local pressure altitude under standard day conditions.

5. The system of claim 4 in which said vibrating pressure sensor means comprises
    a vibratory pressure sensor for providing a cyclic signal with frequency a function of barometric pressure,
    a sensor counter responsive to said cyclic signal for providing a gating pulse of width in accordance with a predetermined number of cycles thereof,
    a source of clock pulses, and
    gating means responsive to said clock pulses and to said gating pulse for transmitting said clock pulses during the occurrence of said gating pulse thereby providing said groups of pulses.

6. The system of claim 4 in which said first variable frequency altering means comprises a binary rate multiplier having one input responsive to said groups of pulses, another input responsive to said output signal of said first feedback means and its output coupled to said altitude pulse counting means.

7. The system of claim 4 in which said first feedback means comprises
    a first memory address counter coupled to said altitude pulse counting means for providing a sequence of digital address signals in response to said altitude pulse count signal, and
    first memory means coupled to said first memory address counter for providing predetermined digital parameter signals in response to said address signals for controlling said first variable frequency altering means.

8. The system of claim 4 in which said computer means comprises
    comparator means responsive to said altitude pulse count signal and to said local elevation signal for providing a comparison signal in accordance with the equality and inequality therebetween,
    a source of clock pulses, and
    gating means responsive to said clock pulses and to said comparison signal for transmitting said clock pulses to said altitude pulse counting means when said altitude pulse count signal is not equal to said local elevation signal and for interrupting said clock pulses when said altitude pulse count signal is equal to said local elevation signal,
    said altitude pulse counting means including means for altering said altitude pulse count signal in response to said transmitted clock pulses until said altitude pulse count signal is rendered equal to said local elevation signal,
    whereby the pulse count of said transmitted clock pulses is proportional to said altitude difference to provide said altitude difference signal.

9. The system of claim 8 in which said second converter means comprises
    second variable gain means coupled to said gating means and responsive to said altitude difference signal,
    altimeter setting indicating means responsive to the output signal of said second variable gain means,
    second feedback means responsive to the output signal of said altimeter setting indicating means and including second predetermined program means relating pressure altitude around sea level to barometric pressure under standard day conditions,
    said second variable gain means being responsive to the output signal of said second feedback means for controlling the gain thereof for rendering said output signal of said altimeter setting indicating means proportional to said standard day barometric pressure corresponding to said altitude difference.

10. The system of claim 9 in which
    said second program means includes means relating said altitude difference pulse count of said transmitted clock pulses to barometric pressure under standard day conditions,
    said second variable gain means comprises second variable frequency altering means for altering said altitude difference pulse count in accordance with said output signal of said second feedback means, and
    said altimeter setting indicating means comprises altimeter setting pulse counting means for providing an altimeter setting pulse count signal in accordance with the altered pulse count from said second frequency altering means,
    whereby said altimeter setting pulse count signal of said altimeter setting pulse counting means is rendered proportional to the standard day barometric pressure corresponding to said altitude difference.

11. The system of claim 10 in which said second feedback means comprises
    a second memory address counter coupled to said altimeter setting pulse counting means for providing a sequence of digital address signals in response to said altimeter setting pulse count signal, and
    second memory means coupled to said second memory address counter for providing predetermined digital parameter signals in response to said address signals for controlling said second variable frequency altering means.

12. The system of claim 11 in which said second variable frequency altering means comprises a binary rate multiplier having one input responsive to said transmitted clock pulses, another input responsive to said digital parameter signals from said second memory means and its output coupled to said altimeter setting pulse counting means.

13. The system of claim 11 in which
    said comparator means further provides further comparison signals in accordance with said altitude pulse count signal being greater or less than said local elevation signal, and
    said altitude pulse counting means comprises an up/down counter responsive to said further comparison signals and to said transmitted clock pulses for counting down when said altitude pulse count signal is greater than said local elevation signal and for counting up when said altitude pulse count signal is less than said local elevation signal.

14. The system of claim 13 in which
    said altimeter setting pulse counting means comprises an up/down counter responsive to said further comparison signals and to said altered altitude difference pulse count from said second frequency altering means for counting down when said altitude pulse count signal is greater than said local elevation signal and for counting up when said altitude pulse count signal is less than said local elevation signal,
    said second converter means includes means for presetting said altimeter setting counter to standard day sea level barometric pressure, and
    said second memory address counter comprises an up/down counter responsive to said further comparison signals for counting in one direction when said altitude pulse count signal is greater than said local elevation signal and for counting in the opposite direction when said altitude pulse count signal is less than said local elevation signal.

15. The system of claim 14 further including parallel to serial converter means coupled to said altimeter setting counter for converting said altimeter setting pulse count signal from parallel digital to serial digital format.

16. The system of claim 15 further including frequency shift keying means responsive to said serial digital signal for providing a serial frequency shift keyed signal corresponding thereto.

17. The system of claim 15 further including auxiliary coding means responsive to said serial digital signal for providing a serial coded signal corresponding thereto.

18. The system of claim 17 in which said auxiliary coding means comprises a modem interface.

19. The system of claim 15 further including display means responsive to said serial digital altimeter setting signal for displaying said altimeter setting pressure.

20. The system of claim 19 in which said display means comprises
    serial to parallel converter means responsive to said serial digital altimeter setting signal for converting said signal to parallel format, decoder means responsive to said parallel digital altimeter setting signal for providing readout control signals corresponding thereto, and digital readout means coupled to said decoder means for displaying said altimeter setting pressure in digital format in response to said readout control signals.

21. The system of claim 19 in which said vibratory pressure sensor means includes a vibratory pressure sensor for providing a cyclic signal with frequency a function of barometric pressure.

22. The system of claim 21 further including monitoring means comprising a source of monitor signal of predetermined frequency, means for replacing said vibrating pressure sensor signal with said monitor signal, a source of test elevation signal of predetermined value, means for replacing said local elevation signal with said test elevation signal, serial-to-parallel converter means responsive to said serial digital altimeter setting signal for converting said signal to parallel format, means for providing a test altimeter setting pressure signal representative of the altimeter setting pressure corresponding to said predetermined frequency of said monitor signal and said predetermined value of said test elevation signal, test comparator means responsive to said parallel digital altimeter setting signal and said test altimeter setting signal for providing a failure signal when said parallel digital altimeter setting signal and said test altimeter setting signal fail to compare, and means responsive to said failure signal for inserting signals into said parallel-to-serial converter means for controlling said display means to display failure indicia.

23. The system of claim 10 further including digital indicator and decoding means responsive to the output of said altimeter setting pulse counting means for displaying said altimeter setting pressure.

24. The system of claim 1 in which said second converter means comprises second variable gain means responsive to said altitude difference signal, altimeter setting indicating means responsive to the output signal of said second variable gain means, second feedback means responsive to the output signal of said altimeter setting indicating means and including second predetermined program means relating pressure altitude to barometric pressure under standard day conditions, said second variable gain means being responsive to the output signal of said second feedback means for controlling the gain thereof for rendering said output signal of said altimeter setting indicating means proportional to said standard day barometric pressure corresponding to said altitude difference.

25. A digital altimeter setting indiciator system comprising a vibratory pressure sensor for providing a cyclic signal with frequency a function of local barometric pressure, a sensor counter responsive to said cyclic signal for providing a gating pulse of width in accordance with a predetermined number of cycles thereof, a source of clock pulses, first gating means responsive to said clock pulses and to said gating pulse for transmitting said clock pulses during the occurrence of said gating pulse thereby providing groups of pulses of pulse count in accordance with said local barometric pressure, a first binary rate multiplier having a pulse train input responsive to said groups of pulses, a digital control input and a pulse train output for altering said pulse counts in accordance with said digital control input, an altitude up/down pulse counter coupled to said pulse train output of said first binary rate multiplier for providing a digital altitude pulse count signal in accordance with said altered pulse counts, a first memory address counter coupled to said altitude counter for providing a sequence of first digital address signals in response to said altitude pulse count signal, a first memory coupled to said first memory address counter for storing first digital parameter signals relating said sensor pulse counts to pressure altitude under standard day conditions and for providing said digital parameter signals in response to said first address signals, said digital control input of said first binary rate multiplier being coupled to receive said first digital parameter signals for rendering said altitude pulse count signal proportional to local pressure altitude under standard day conditions in response to said pressure sensor signal, settable means for providing a digital signal corresponding to actual local elevation, a digital comparator responsive to said altitude pulse count signal and said local elevation signal for providing a comparison signal in accordance with the equality therebetween and for providing further comparison signals in accordance with said altitude pulse count signal being greater or less than said local elevation signal, second gating means responsive to said clock pulses and to said comparison signal for transmitting said clock pulses to said altitude pulse counter when said altitude pulse count signal is not equal to said local elevation signal and for interrupting said clock pulses when said altitude pulse count signal is equal to said local elevation signal, said altitude pulse counter being responsive to said transmitted clock pulses and to said further comparison signals for counting down when said altitude pulse count signal is greater than said local elevation signal and for counting up when said altitude pulse count signal is less than said local elevation signal until said altitude pulse count signal is rendered equal to said local elevation signal, whereby the pulse count of said transmitted clock pulses is proportional to the altitude difference between said altitude pulse count signal and said local elevation signal, a second binary rate multiplier having a pulse train input responsive to said transmitted altitude difference clock pulses, a digital control input and a pulse train output for altering said pulse count of said transmitted clock pulses in accordance with said digital control input, an altimeter setting up/down pulse counter coupled to said pulse train output of said second binary rate multiplier and responsive to said further comparison signals for counting down when said altitude pulse count signal is greater than said local elevation signal and for counting up when said altitude pulse count signal is less than said local elevation signal to provide a digital altimeter setting pulse count signal in accordance with said altered pulse count of said transmitted clock pulses, means for presetting said altimeter setting counter to standard day sea level barometric pressure, a second memory address up/down counter coupled to said altimeter setting counter and responsive to said further comparison signals for counting in one direction e27 aid altitude pulse count signal is greater than said local elevation signal and for counting in the opposite direction when said altitude pulse count signal is less than said local elevation signal to provide a sequence of second digital address signals in response to said altimeter setting pulse count signal, a second memory coupled to said second memory address counter for storing digital parameter signals relating said altitude difference pulse count of said transmitted clock pulses to barometric pressure around sea level under standard day conditions and for providing said digital parameter signals in response to said second address signals, said digital control input of said second binary rate multiplier being coupled to receive said second digital parameter signals for rendering said altimeter setting pulse count signal proportional to the standard day barometric pressure corresponding to said altitude difference thereby providing said altimeter setting pressure, means for transmitting said altimeter setting pulse count signal, and a display means responsive to said transmitted altimeter setting pulse count signal for displaying said altimeter setting pressure in digital format.

26. A method for computing altimeter setting pressure from local barometric pressure comprising the steps of providing a signal in accordance with local barometric pressure, converting said local barometric pressure signal to a corresponding local standard day pressure altitude signal, subtracting a signal corresponding to actual local elevation from said pressure altitude signal to provide a signal corresponding to the altitude difference therebetween, and converting said altitude difference signal to a signal proportional to the corresponding standard day barometric pressure to provide said altimeter setting pressure.

* * * * *